US010205135B2

(12) United States Patent
Ibaragi et al.

(10) Patent No.: US 10,205,135 B2
(45) Date of Patent: Feb. 12, 2019

(54) STEEL FOIL FOR POWER STORAGE DEVICE CONTAINER, POWER STORAGE DEVICE CONTAINER, POWER STORAGE DEVICE, AND MANUFACTURING METHOD OF STEEL FOIL FOR POWER STORAGE DEVICE CONTAINER

(71) Applicants: NIPPON STEEL & SUMITOMO METAL CORPORATION, Tokyo (JP); NIPPON STEEL & SUMIKIN MATERIALS CO., LTD., Tokyo (JP)

(72) Inventors: Masaharu Ibaragi, Kisarazu (JP); Koichi Nose, Chiba (JP); Kiyokazu Ishizuka, Himeji (JP); Yasuto Goto, Kimitsu (JP); Shuji Nagasaki, Sagamihara (JP); Hiroto Unno, Yokohama (JP)

(73) Assignees: NIPPON STEEL & SUMITOMO METAL CORPORATION, Tokyo (JP); NIPPON STEEL & SUMIKIN MATERIALS CO., LTD., Tokyo (JP)

( * ) Notice: Subject to any disclaimer, the term of this patent is extended or adjusted under 35 U.S.C. 154(b) by 182 days.

(21) Appl. No.: 15/327,590

(22) PCT Filed: Jul. 22, 2015

(86) PCT No.: PCT/JP2015/070821
§ 371 (c)(1),
(2) Date: Jan. 19, 2017

(87) PCT Pub. No.: WO2016/013575
PCT Pub. Date: Jan. 28, 2016

(65) Prior Publication Data
US 2017/0170436 A1  Jun. 15, 2017

(30) Foreign Application Priority Data

Jul. 22, 2014  (JP) .................................. 2014-149248

(51) Int. Cl.
*H01M 2/02* (2006.01)
*C21D 8/02* (2006.01)
(Continued)

(52) U.S. Cl.
CPC .............. *H01M 2/021* (2013.01); *C21D 8/02* (2013.01); *C21D 8/0236* (2013.01);
(Continued)

(58) Field of Classification Search
CPC ....... H01M 2/021; H01M 2/026; C22C 38/14; C22C 38/12; C21D 9/46; C21D 8/0236; C21D 8/0273; C21D 8/0278
See application file for complete search history.

(56) References Cited

U.S. PATENT DOCUMENTS

| 2009/0029245 A1 | 1/2009 | Ibaragi et al. |
| 2014/0287259 A1 | 9/2014 | Ishizuka et al. |

FOREIGN PATENT DOCUMENTS

| CN | 102388156 A | 3/2012 |
| JP | 2000-357494 A | 12/2000 |

(Continued)

OTHER PUBLICATIONS

International Search Report for PCT/JP2015/070821 (PCT/ISA/210) dated Oct. 27, 2015.
(Continued)

*Primary Examiner* — Jessee R Roe
(74) *Attorney, Agent, or Firm* — Birch, Stewart, Kolasch & Birch, LLP

(57) ABSTRACT

A steel foil for a power storage device container includes a rolled steel foil, a nickel layer formed on a surface of the rolled steel foil, and a chromium-based surface treatment layer formed on a surface of the nickel layer. The nickel layer includes an upper layer portion which is in contact with the chromium-based surface treatment layer and contains Ni
(Continued)

of 90 mass % or more among metal elements, and a lower layer portion which is in contact with the rolled steel foil and contains Ni of less than 90 mass % among the metal elements and Fe. <111> polar density in a reverse pole figure of the nickel layer in a rolling direction is 3.0 to 6.0. The nickel layer has a sub-boundary which is a boundary between two crystals having a relative orientation difference of 2° to 5°, and a large angle boundary which is a boundary between two crystals having the relative orientation difference of equal to or more than 15°. The average value of a ratio L5/L15 between a boundary length L5 which is the length of the sub-boundary, and a boundary length L15 which is the length of the large angle boundary, is equal to or more than 1.0.

10 Claims, 6 Drawing Sheets

(51) Int. Cl.

| | | |
|---|---|---|
| *C21D 9/46* | (2006.01) | |
| *C25D 5/50* | (2006.01) | |
| *C25D 11/38* | (2006.01) | |
| *C22C 38/06* | (2006.01) | |
| *C22C 38/14* | (2006.01) | |
| *H01G 11/78* | (2013.01) | |
| *C22C 38/00* | (2006.01) | |
| *C22C 38/02* | (2006.01) | |
| *C22C 38/04* | (2006.01) | |
| *C22C 38/12* | (2006.01) | |
| *C23C 26/00* | (2006.01) | |
| *C23C 28/00* | (2006.01) | |
| *C25D 7/06* | (2006.01) | |
| *C25D 3/12* | (2006.01) | |
| *H01M 10/0525* | (2010.01) | |

(52) U.S. Cl.
CPC ......... *C21D 8/0273* (2013.01); *C21D 8/0278* (2013.01); *C21D 8/0284* (2013.01); *C21D 9/46* (2013.01); *C22C 38/001* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C23C 26/00* (2013.01); *C23C 28/00* (2013.01); *C23C 28/321* (2013.01); *C23C 28/34* (2013.01); *C23C 28/3455* (2013.01); *C25D 5/50* (2013.01); *C25D 7/0614* (2013.01); *C25D 11/38* (2013.01); *H01G 11/78* (2013.01); *H01M 2/026* (2013.01); *H01M 2/0292* (2013.01); *C21D 2201/05* (2013.01); *C25D 3/12* (2013.01); *H01M 10/0525* (2013.01); *H01M 2220/30* (2013.01); *Y02E 60/13* (2013.01)

(56) References Cited

FOREIGN PATENT DOCUMENTS

| | | |
|---|---|---|
| JP | 2006-140018 A | 6/2006 |
| WO | 2007/072604 A1 | 6/2007 |
| WO | 2013-17030 A | 9/2013 |
| WO | 2013/157600 A1 | 10/2013 |

OTHER PUBLICATIONS

Written Opinion of the International Searching Authority for PCT/JP2015/070821 (PCT/ISA/237) dated Oct. 27, 2015.

Hayashi et al., "Creation of Equiaxed Fine Ferrite Structure by Warm Working of Martensite," Digests of the Annual Conference on the Japan Society for Heat Treatment (1998), vol. 46, pp. 19-20, with English translation.

Nakamura et al., "Cold-rolling Characteristics of Aluminum Plated Stainless Steel," CAMP-ISIJ (1990), vol. 3, pp. 1356, with English translation.

Li et al., Manufacturing Technology for Stainless Steel Plates and Strips, Chemical Industry Press, Jun. 2008, pp. 256-257, with English translation.

Office Action dated Nov. 1, 2017, in Chinese Patent Application No. 201580039626.6, with English translation.

(ANGLE DIFFERENCE 15° OR MORE)

(ANGLE DIFFERENCE 2° TO 5°)

STEEL FOIL FOR POWER STORAGE DEVICE CONTAINER, POWER STORAGE DEVICE CONTAINER, POWER STORAGE DEVICE, AND MANUFACTURING METHOD OF STEEL FOIL FOR POWER STORAGE DEVICE CONTAINER

TECHNICAL FIELD OF THE INVENTION

The present invention relates to a steel foil for a power storage device container, a power storage device container, a power storage device, and a manufacturing method of the steel foil for a power storage device container. Priority is claimed on Japanese Patent Application No. 2014-149248, filed on Jul. 22, 2014, the content of which is incorporated herein by reference.

RELATED ART

A secondary battery such as a nickel-cadmium battery, a nickel-hydrogen battery, and a lithium-ion battery is widely used in an electronic device, an electronic component, particularly, a portable phone, a note-type personal computer, a video camera, a satellite, and an electric or hybrid vehicle. In the related art, in a secondary battery using a strong alkali electrolyte, such as a nickel-cadmium battery and a nickel-hydrogen battery, a case formed of a nickel-plated cold-rolled steel sheet or a plastic case is used as a case of the secondary battery. In a battery using a nonaqueous electrolyte, such as a lithium-ion battery, a nickel-plated steel sheet or stainless steel sheet is used for the case of the battery. Further, in the lithium-ion battery, a nonaqueous electrolyte incorporated in an aluminum pouch may be enclosed in a plastic case.

Recently, a reduction in the size and the weight of a secondary battery has been desired in association with a reduction in the size of an electronic or electric component. In accordance with such a trend, thinning of a secondary battery container is attractive as a method in which more electrolyte or active material can be incorporated in the limited volume so as to enable an increase of battery capacity. If the strength of the container by the thinning is degraded, there is a risk that the container is deformed or fractured when an external force is applied to the container or the container is pierced, and thus the electrolyte which is in the container may leak. The leakage of an electrolyte has a high probability of greatly damaging a device having a built-in secondary battery. In a case where a container is made of plastic or aluminum, generally, the strength is insufficient when the thickness is equal to or less than 200 μm. Thus, using a material which has high strength is needed for performing more thinning of a container. However, in terms of mass production, it is preferable that the material be cheap and versatile. That is, a material which has high strength, suitable corrosion resistance against an electrolyte (nonaqueous electrolyte), and high versatility is required in order to reduce the thickness of a secondary battery container. A container of a power storage device such as a capacitor including an electrolyte, which excludes the secondary battery, is also requested similarly.

For example, in Patent Document 1, a metallic foil in which an acid-modified polyolefin resin layer having properties as a barrier to a corrosion-causing substance is stacked on an aluminum foil subjected to chromium-based surface treatment such as trivalent chromium treatment or chromate treatment is proposed. According to this technology, it is possible to improve the workability or corrosion resistance to some extent. However, as described above, the strength of aluminum is insufficient.

Using a steel foil such as a stainless steel foil is considered as a material having high strength. Such a steel foil is a foil obtained by thinning steel so as to have a thickness of 200 μm or less. The tensile strength and Vickers hardness of the steel foil are generally 2 to 10 times those of plastic and aluminum. Thus, the stainless steel foil is a prospective thin material of the secondary battery container. However, the corrosion resistance of the steel foil in an electrolyte is worse. Thus, if the stainless steel foil is used in a housing or a lead line of a battery, the stainless steel foil may become corroded by the electrolyte.

In Patent Document 2, a metallic foil is proposed in which a resin layer such as a polyolefin resin layer is stacked on a chromium-based surface treated stainless steel foil and the like. In this steel foil, it is possible to achieve both of certain strength and certain corrosion resistance. However, in a case using a stainless steel foil, the material is expensive, and the amount of work hardening is large. Thus, there is a problem in that the cost of obtaining a foil by rolling is also increased.

Patent Document 3 discloses that a rolled steel foil subjected to plating is used as a negative-electrode current collecting foil in a secondary battery using a nonaqueous electrolyte. However, the negative-electrode current collecting foil is different from a power storage device container and is held at a negative-electrode potential when being used. Thus, cathodic protection is electro-chemically performed. On the contrary, electro-chemical protection does not act on a container material used at a neutral electric potential. Thus, higher corrosion resistance is required.

Because the negative-electrode current collecting foil is a member in which the size of the surface area of the foil is set to large so as to improve main capability of a battery, such as capacity and an output of the battery, the negative-electrode current collecting foil has an area much larger than that of the container material, as a member of the battery. Thus, a request of cost reduction from a battery manufacturer is severe. In addition, in order to reduce manufacturing cost, generally, rolling is performed with high efficiency on rolling passes of which the number is the minimum by high reduction. Patent Document 3 also discloses that rolling at high reduction of 50% can be performed.

However, as will be described later, rolling at high reduction is advantageous for controlling the texture of a foil, but is a cause of degrading corrosion resistance. Thus, it is considered that the steel foil in Patent Document 3 has insufficient corrosion resistance as a container of a secondary battery, which requires a higher corrosion resistance.

PRIOR ART DOCUMENT

Patent Document

[Patent Document 1] Japanese Unexamined Patent Application, First Publication No. 2000-357494
[Patent Document 2] PCT International Publication No. WO2007/072604
[Patent Document 3] PCT International Publication No. WO2013/157600

DISCLOSURE OF THE INVENTION

Problems to be Solved by the Invention

The present invention considers the above-described circumstances and was developed. An object of the present invention is to provide a steel foil for a power storage device container which is a rolled steel foil having high strength, and which has excellent adhesion between a substrate and a resin layer even in an electrolyte (nonaqueous electrolyte) in a case of being used in a power storage device container of which a polyolefin resin layer is formed on a surface, at a low price. Another object of the present invention is to provide a power storage device container including the steel foil for a power storage device container, and provide a power storage device including the power storage device container. Still another object of the present invention is to provide a manufacturing method of a steel foil for a power storage device container. In the present invention, adhesion between a substrate and a resin layer in an electrolyte is referred to as electrolyte resistance.

Means for Solving the Problem

The present invention is completed based on the above findings. The gist of the present invention is as follows.

(1) According to an aspect of the present invention, a steel foil for a power storage device container includes a rolled steel foil, a nickel layer formed on a surface of the rolled steel foil, and a chromium-based surface treatment layer formed on a surface of the nickel layer. The nickel layer includes an upper layer portion which is in contact with the chromium-based surface treatment layer and contains Ni of 90 mass % or more among metal elements, and a lower layer portion which is in contact with the rolled steel foil and contains Ni of less than 90 mass % among the metal elements and Fe. <111> polar density in a reverse pole figure of the nickel layer in a rolling direction is 3.0 to 6.0. The nickel layer has a sub-boundary which is a grain boundary between two crystals having a relative orientation difference of 2° to 5°, and a large angle boundary which is a grain boundary between two crystals having the relative orientation difference of equal to or more than 15°. The average value of the ratio L5/L15 between a boundary length L5 which is the length of the sub-boundary, and a boundary length L15 which is the length of the large angle boundary, is equal to or more than 1.0.

(2) In the steel foil for a power storage device container described in (1), the adhered amount of the nickel layer may be equal to or more than 0.3 g/m².

(3) The steel foil for a power storage device container described in (1) or (2) may further include a polyolefin-based resin layer which is formed on the surface of the chromium-based surface treatment layer.

(4) According to another aspect of the present invention, a power storage device container includes the steel foil for a power storage device container described in (3).

(5) According to still another aspect of the present invention, a power storage device includes the power storage device container described in (4).

(6) According to still another aspect of the present invention, a manufacturing method of a steel foil for a power storage device container includes a nickel-plating process of performing a nickel plating on a steel sheet so as to form a nickel-plated layer on the steel sheet, and obtaining a nickel-plated steel sheet, a recrystallization annealing process of performing an annealing on the nickel-plated steel sheet so that the nickel-plated layer recrystallizes, a cold-rolling process of performing a cold rolling on the nickel-plated steel sheet so as to obtain a steel foil, and a chromium-based surface treatment process of performing chromium-based surface treatment on the steel foil. In the cold-rolling process, the number of rolling passes is set to be equal to or more than seven passes, a reduction on a first rolling pass is set to be equal to or less than 30%, a cumulative rolling reduction until a fourth rolling pass is set to be equal to or less than 70%, a difference between a cumulative rolling reduction until a rolling pass before two passes from a final pass, and the cumulative rolling reduction until the final pass is set to be equal to or less than 5%, and cumulative rolling reduction until the final pass is set to be equal to or more than 70%.

(7) In the manufacturing method of a steel foil for a power storage device container described in (6), in the nickel-plating process, the adhered amount of the nickel-plated layer may be set to be equal to or more than 1 g/m².

(8) The manufacturing method of a steel foil for a power storage device container described in (6) or (7) may further include a polyolefin resin layer forming process of forming a polyolefin resin layer on the surface of the steel foil after the chromium-based surface treatment process.

Effects of the Invention

According to the above aspects of the present invention, it is possible to provide a steel foil for a power storage device container which is a rolled steel foil having high strength, and which has excellent adhesion between a substrate and a resin layer even in an electrolyte in a case of being used in a power storage device container of which a polyolefin resin layer is formed on a surface, at a low price. It is possible to provide a power storage device container including the steel foil for a power storage device container, and a power storage device including the power storage device container.

EMBODIMENTS OF THE INVENTION

A container in which a polyolefin resin layer is formed on a metal substrate on which a chromium-based surface treatment layer is formed is generally used for a power storage device container manufactured by using a steel foil for a power storage device container. In the embodiment, a surface-treated layer formed by chromium-based surface treatment such as trivalent chromium treatment or chromate treatment is referred to as a chromium-based surface treatment layer.

The inventors have diligently conducted an investigation on the cause of exfoliating a resin layer in an electrolyte in such a power storage device container.

Such a power storage device container is always exposed by a nonaqueous electrolyte included in a power storage device. The nonaqueous electrolyte includes an organic solvent and a lithium salt. Thus, if the nonaqueous electrolyte is used for a long period of time, a corrosion-causing substance such as acid may be generated by decomposing the organic solvent or the lithium salt. For example, in a case where lithium hexafluorophosphate is used as the lithium salt, fluorinated acid may be generated as the corrosion-causing substance.

The inventors have found that a corrosion-causing substance attacks a metal substrate, a chromium-based surface treatment layer, or a polyolefin resin layer, and thus the polyolefin resin layer may be exfoliated if the corrosion-causing substance is generated in an organic solvent. It is considered that exfoliation of the polyolefin resin layer occurs by corrosion of the metal substrate or degradation of the polyolefin resin layer. Thus, it is considered that improving corrosion resistance of the metal substrate is effective for preventing exfoliation of the polyolefin resin layer.

Figure 5:
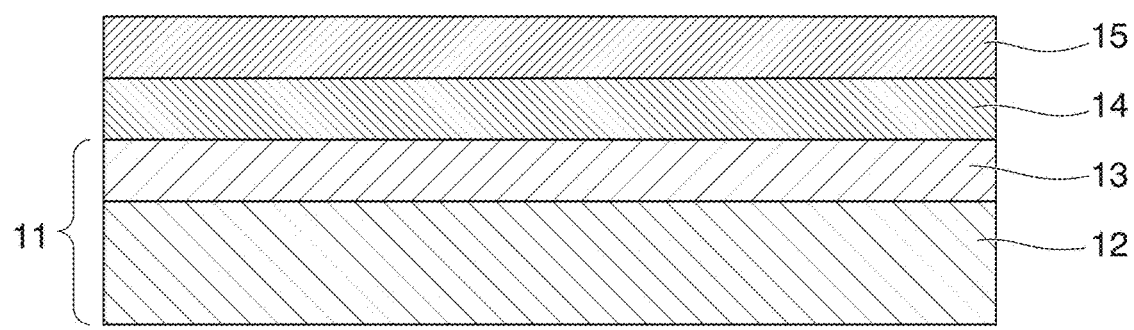
FIG. 5 is a schematic diagram showing a cross section of the steel foil for a power storage device container according to the embodiment.

A steel foil for a power storage device container according to an embodiment (may be referred to as a steel foil according to the embodiment, below) includes a rolled steel foil of which a nickel layer having specific texture is formed on a surface and which serves as a substrate, and a chromium-based surface treatment layer which is formed on the surface of the nickel layer of the rolled steel foil. Further, a polyolefin resin layer may be formed on the chromium-based surface treatment layer, as shown in FIG. 5, in the steel foil for a power storage device container according to the embodiment. In the steel foil for a power storage device container according to the embodiment, the nickel layer adhering to the surface of the rolled steel foil includes specific texture, and a portion at which nickel of 90 mass % or more among metal elements is contained is present in a surface layer of the nickel layer. Thus, it is possible to expect improvement of corrosion resistance against a nonaqueous electrolyte. Hereinafter, the steel foil for a power storage device container according to the embodiment will be described in detail.

<Substrate>

In the steel foil according to the embodiment, the rolled steel foil of which a nickel layer having specific texture is formed on the surface is used as a substrate.

The reason using the rolled steel foil is because, as will be described later, rolling is also useful for controlling texture of the nickel layer formed on the surface, in addition to being more advantageous than an electrolyte foil, from a point of cost and strength.

<Rolled Steel Foil>

A rolled steel foil used as the substrate of the steel foil according to the embodiment is obtained by rolling a steel sheet. The steel sheet is not particularly limited, and may use any of a hot-rolled steel sheet, a cold-rolled steel sheet, and a cold-rolled annealed steel sheet. However, it is often difficult to work the hot-rolled steel sheet by cold rolling, which will be described later, so as to be a foil of 100 μm or less from a viewpoint of rolling capacity. Even though using the hot-rolled steel sheet is possible, it is ineffective and uneconomical. Thus, it is preferable to use a cold-rolled steel sheet or a cold-rolled annealed steel sheet as the substrate of the steel foil according to the embodiment.

An element composition (chemical composition) of a steel sheet used as the substrate of the steel foil for a power storage device container according to the embodiment is not particularly limited. Containing an amount of a specific element in the steel sheet in order to improve strength or improve corrosion resistance is not a necessary requirement. In addition, steel having high strength steel sheet may be applied. However, from a point of ensuring rolling properties which will be described later, a steel sheet having a general element composition is preferably used. An example of the element composition is as follows. % relating to the element composition is mass %.

C: 0.0001 to 0.1%,
Si: 0.001 to 0.5%,
Mn: 0.01 to 1.0%,
P: 0.001 to 0.05%,
S: 0.0001 to 0.02%,
Al: 0.0005 to 0.20%,
N: 0.0001 to 0.0040%, and
Remainder: Fe and impurities The reason that the amount of each element is preferably in the above-described range will be described.

(C: 0.0001 to 0.1%)

C is an element for improving strength of steel. If the C content is too high, the strength of the steel is too high, and thus rolling properties are degraded. As will be described later, the strength of the steel foil according to the embodiment is increased by work hardening at high cumulative rolling reduction. Thus, in terms of easy rolling, a steel sheet used as a material is preferably soft. Thus, the upper limit of the C content is preferably set to 0.1%. The lower limit of the C content is not required to be particularly specified. However, in terms of refining cost, the lower limit of the C content is preferably set to be 0.0001%. The C content is more preferably 0.001% to 0.01%.

(Si: 0.001 to 0.5%)

Si is an element for improving strength of steel. If the Si content is too high, the strength of the steel is too high, and thus rolling properties of steel are degraded. Thus, the upper limit of the Si content is preferably set to 0.5%. The lower limit of the Si content is not required to be particularly specified. However, in terms of refining cost, the lower limit of the Si content is preferably set to be 0.001%. The Si content is more preferably 0.001 to 0.02% in order to ensure higher rolling properties.

(Mn: 0.01 to 1.0%)

Mn is an element for improving strength of steel. If the Mn content is too high, the strength of the steel is too high, and thus rolling properties are degraded. Thus, the upper limit of the Mn content is preferably set to 1.0%. The lower limit of the Mn content is not required to be particularly specified. However, in terms of refining cost, the lower limit of the Mn content is preferably set to be 0.01%. The Mn content is more preferably set to be 0.01 to 0.5% in order to ensure higher rolling properties.

(P: 0.001 to 0.05%)

P is an element for improving strength of steel. If the P content is too high, the strength of the steel is too high, and thus rolling properties are degraded. Thus, the upper limit of the P content is preferably set to 0.05%. The lower limit of the P content is not required to be particularly specified. However, in terms of refining cost, the lower limit of the P content is preferably set to be 0.001%. The P content is more preferably set to be 0.001 to 0.02% in order to ensure higher rolling properties.

(S: 0.0001 to 0.02%)

S is an element which degrades hot workability and corrosion resistance of steel. Thus, the S content is preferable as small as possible. In particular, if the S content is more than 0.02%, hot workability and corrosion resistance is significantly degraded. Thus, the upper limit of the S content is preferably set to 0.02%. The lower limit of the S content is not required to be particularly specified. However, in terms of refining cost, the lower limit of the S content is preferably set to be 0.0001%. The S content is more preferably set to be 0.001 to 0.01% in order to ensure higher rolling properties and to obtain predominance from a view point of cost.

(Al: 0.0005 to 0.20%)

Al is added as a deoxidizing element of steel. The Al content is preferably set to be equal to or more than 0.0005% in order to obtain effects occurring by deoxidation. However, if the Al content is too high, rolling properties of steel are degraded. Thus, the upper limit of the Al content is preferably set to 0.20%. The Al content is more preferably set to be 0.001 to 0.10% in order to ensure higher rolling properties.

(N: 0.0001 to 0.0040%)

N is an element which degrades hot workability and workability of steel. Thus, the N content is preferable as small as possible. In particular, if the N content is more than 0.0040%, hot workability and workability is significantly degraded. Thus, the upper limit of the N content is preferably set to 0.0040%. The lower limit of the N content is not required to be particularly specified. However, in terms of refining cost, the lower limit of the N content is preferably set to be 0.0001%. The N content is more preferably set to be 0.001 to 0.0040% in order to obtain predominance in a point of cost.

(Remainder: Fe and Impurities)

The remainder of the steel sheet is Fe and impurities.

Steel for manufacturing the steel foil according to the embodiment may further contain Ti, Nb, B, Cu, Ni, Sn, Cr, and the like as additional elements. The additional elements may be included as long as the effects of the embodiment, are not degraded, instead of some of Fe. In particular, Ti and Nb have an effect of fixing C and N in steel as a carbide and a nitride, and improving the workability of steel. Thus, one type or two of Ti and Nb may be contained in a range of Ti: 0.01 to 0.8% and Nb: 0.005 to 0.05%.

<Nickel Layer>

A nickel layer included in the steel foil according to the embodiment includes texture in which the <111> orientation is parallel to the rolling direction (rolling direction of the steel foil). Here, the <111> orientation being parallel to the rolling direction means that the <111> orientation of Ni (nickel) in an fcc (face-centered cubic lattice) structure is parallel to the rolling direction.

Specifically, as the texture, polar density of the <111> orientation in the rolling direction is equal to or more than 3.0. If the polar density of the <111> orientation in the rolling direction is equal to or more than 3.0, good characteristics are obtained. The polar density of the <111> orientation in the present invention is defined as the maximum value of polar density in a range of a crystal orientation which is within 5° from <111>. The maximum value of the polar density of the <111> orientation in the rolling direction is not particularly limited. However, generally, the maximum value thereof is not more than about 6.0. Thus, the substantial upper limit of the polar density of the <111> orientation in the rolling direction is 6.0.

By setting the texture of nickel to be in the above-described range, it is possible to improve corrosion resistance with the small amount of nickel. In other words, it becomes possible to minimize the amount of nickel required for satisfying corrosion resistance against the corrosion-causing substance included in an organic electrolyte. Thus, it is useful from a viewpoint of cost. That is, with the above configuration, both of cost and performance have a level which is excellent in Industrial capability.

The reason of obtaining such an effect with the small amount of nickel is not necessarily clear. However, it is estimated that improving the uniformity and coatability of nickel has an influence on the above effect. Specifically, Ni has an fcc structure, and a close-packed plane is the {111} plane. Thus, it is estimated that when the <111> orientation in the nickel layer is set to be parallel to the rolling direction, a dense nickel layer is formed.

In Ni having the fcc structure, the {111} plane is referred to as a "slip plane". The {111} plane can be preferentially oriented by deformation processing in which cold rolling or the like is performed. Thus, it is possible to control the above-described texture by using a rolling process.

The electron back scatter diffraction (EBSD) method is used for specifying the texture of the nickel layer in the steel foil according to the embodiment. Specifically, Crystal orientations at an originating point of a diffraction pattern are continuously measured by using the obtained EBSD pattern obtained from a surface of a sample which is largely inclined (70°), in a scanning electron microscope (SEM).

A feature of the EBSD pattern is that depth of obtained information is significantly shallow. Although the depth depends on conditions, the depth is just several tens nm. Thus, by performing EBSD measurement in a sheet surface direction, it is possible to specify the crystal orientation of only Ni of the surface of the nickel layer. Further, a reverse pole figure can be obtained from the EBSD pattern, and the polar density can be obtained.

Figure 1A:
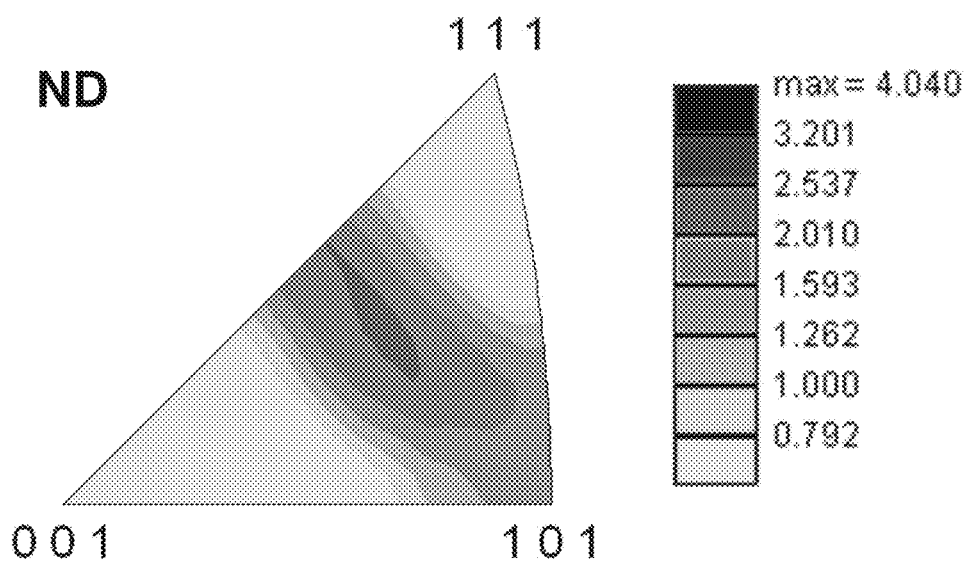
FIG. 1A is a diagram showing an example of Ni texture (reverse pole figure) in a steel foil for a power storage device container according to an embodiment, which is measured by an EBSD method, and specifically, a reverse pole figure in ND, that is, a normal direction of a sheet surface.
Figure 1B:
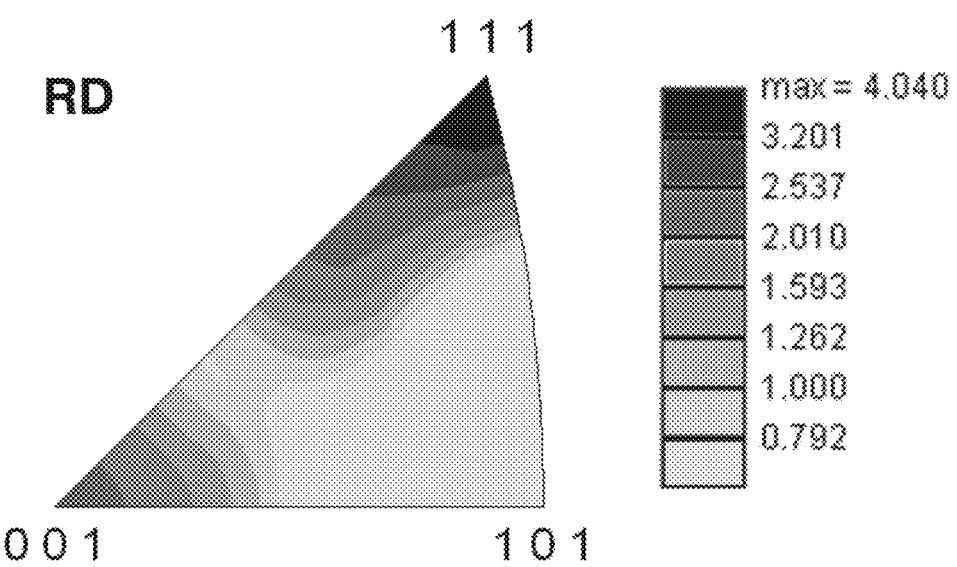
FIG. 1B is a diagram showing an example of the Ni texture (reverse pole figure) in the steel foil for a power storage device container according to the embodiment, which is measured by the EBSD method, and specifically, a reverse pole figure in RD, that is, a rolling direction.
Figure 1C:
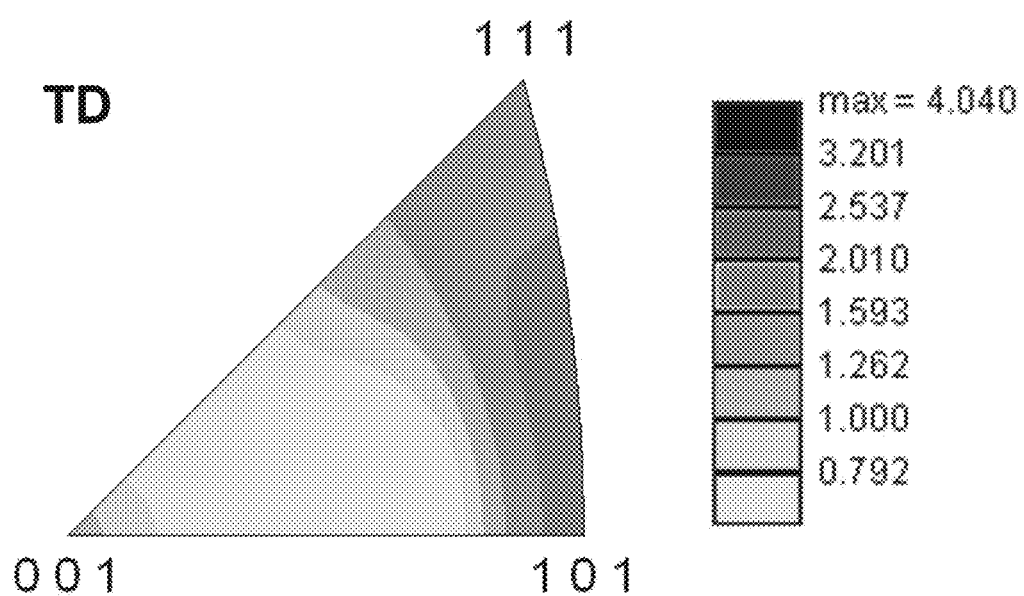
FIG. 1C is a diagram showing an example of the Ni texture (reverse pole figure) in the steel foil for a power storage device container according to the embodiment, which is measured by the EBSD method, and specifically, a reverse pole figure in TD, that is, a direction perpendicular to the rolling direction.

FIGS. 1A to 1C show an example of the texture (reverse pole figure), which is obtained by the EBSD method, of the nickel layer in the steel foil according to the embodiment. FIGS. 1A to 1C are diagrams, respectively, in which the degree of the texture is denoted by contour lines of polar density in ND (normal direction of the sheet surface), RD (rolling direction), and TD (direction perpendicular to the rolling direction) on the premise that polar density in a state where the crystal orientations are totally not deviated (so-called a random state) is set as 1. FIG. 1A shows a reverse pole figure in ND. FIG. 1B shows a reverse pole figure in RD, and FIG. 1C shows a reverse pole figure in TD.

According to FIGS. 1A to 1C, it is understood that the nickel layer included in the steel foil according to the embodiment has specific texture, and an integration degrees of the <111> and <001> orientations in RD are high. Referring a scale of the contour lines which are shown in FIGS. 1A to 1C, polar density of the <111> orientation in RD has a scale of 3.201 to 4.040, and polar density of the <001> orientation in RD has a scale of 2.01 to 2.537. Thus, it is understood that the nickel layer in the steel foil according to the embodiment is characterized by integration of the <111> orientation in RD. Integration is viewed from <101> to a side of linking <001> and <111> (that is, from <101> to <112>) in ND. Integration of the <101> orientation is viewed in TD. However, referring the scale of the contour lines, the polar densities are lower than 2.6. Thus, it is difficult to determine that distinguishing texture is formed in ND and TD.

The nickel layer of the steel foil according to the embodiment has a sub-boundary in addition to a general boundary. Generally, a boundary (large angle boundary) between two crystals between which a relative orientation difference (angle difference) is equal to or more than 15° is considered as a boundary (grain boundary). The sub-boundary indicates a boundary between two crystals between which the relative orientation difference (angle difference) is lower than 15°. Such a sub-boundary is applied by deformation processing of the nickel layer.

By setting a ratio of a sub-boundary, in particularly, in which the angle difference is equal to or less than 5° among sub-boundaries of 15° or less, to a large angle boundary in which the angle difference is equal to or more than 15°, to be equal to or more than a predetermined value, corrosion resistance against a corrosion-causing substance included in an organic electrolyte is improved. Specifically, when the nickel layer has a sub-boundary which is a boundary between two crystals between which a relative orientation difference is 2° to 5°, and a large angle boundary which is a boundary between two crystals between which the relative orientation difference is equal to or more than 15°, and the average value of the ratio L5/L15 between a boundary length L5 which is a length of the sub-boundary, and a boundary length L15 which is a length of the large angle boundary is equal to or more than 1.0, the corrosion resistance is improved. A sub-boundary in which the angle difference is equal to or less than 5°, and a boundary in which the angle difference is equal to or more than 15° may be also specified by the EBSD method. However, generally, since a large error occurs when a sub-boundary in which the angle difference is equal to or less than 2°, in the embodiment, a ratio of sub-boundaries in which the angle difference is 2° to 5° is used. In the following descriptions, in the embodiment, the sub-boundary indicates a boundary between two crystals between which the relative orientation difference is 2° to 5°.

Figure 2A:
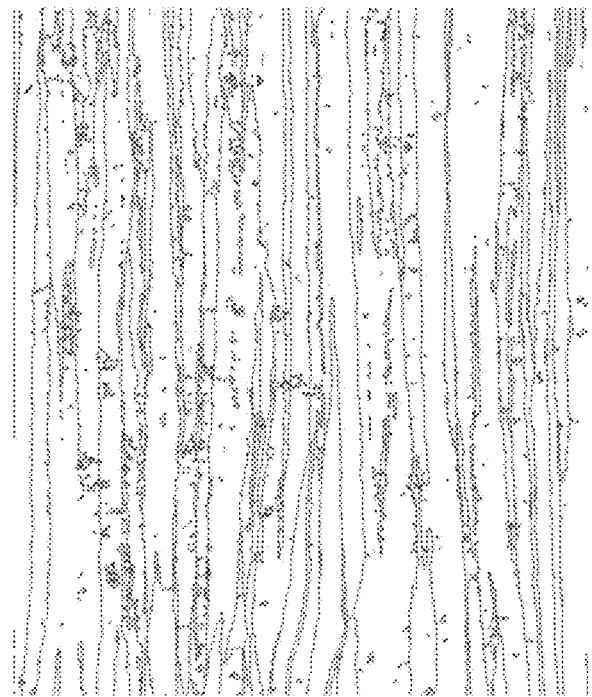
FIG. 2A is a diagram showing an example of a large angle boundary which is a grain boundary between two crystals between which an angle difference (relative orientation difference) is equal to or more than 15°, among Ni grain boundaries in the steel foil for a power storage device container according to the embodiment, which is measured by EBSD (vertical direction of a paper surface is defined as RD, a transverse direction thereof is defined as TD, and a visual field is 120 μm in RD and 100 μm in TD).
Figure 2B:
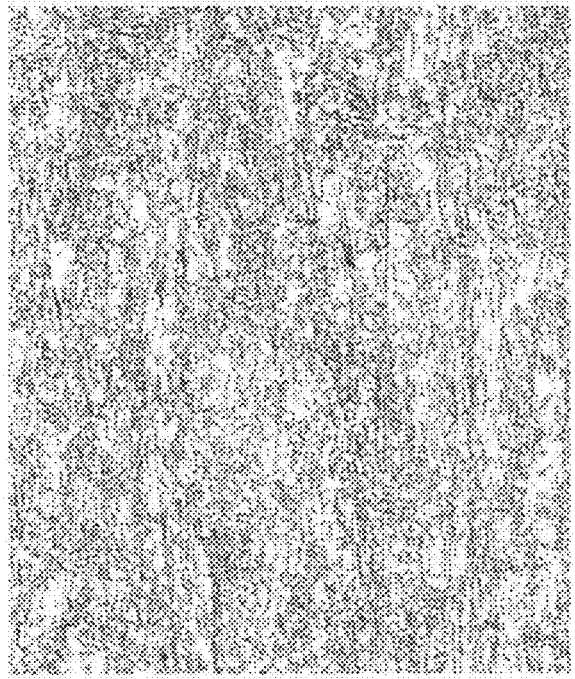
FIG. 2B is a diagram showing an example of a sub-boundary which is a grain boundary between two crystals between which an angle difference (relative orientation difference) is 2° to 5°, among the Ni grain boundaries in the steel foil for a power storage device container according to the embodiment, which is measured by the EBSD method (vertical direction of a paper surface is defined as RD, a transverse direction thereof is defined as TD, and a visual field is 120 μm in RD and 100 μm in TD).

FIGS. 2A and 2B show an example of the large angle boundary or the sub-boundary, which is obtained by the EBSD method, in the nickel layer of the steel foil according to the embodiment. In FIGS. 2A and 2B, a vertical direction of a paper surface is defined as RD, and a transverse direction thereof is defined as TD. A visual field is 120 μm in RD and 100 μm in TD. FIG. 2A shows a large angle boundary confirmed as a boundary in which the angle difference is equal to or more than 15°. FIG. 2B shows a sub-boundary in which the angle difference is 2° to 5°.

As described above, generally, since a large error occurs when a sub-boundary in which the angle difference is equal to or less than 2°, a sub-boundary in which the angle difference is 2° to 5° is measured so as to measure a sub-boundary in which the angle difference is equal to or less than 5°. A boundary having a twin relationship is also indicated as it is, without removal. With such a method, "L5/L15" is calculated by measuring the length (L5) of a sub-boundary in which the angle difference is equal to or less than 5°, and the length (L15) of a boundary in which the angle difference is equal to or more than 15° in any five or more visual fields, using image processing software in an EBSD device, and values regarding the visual fields are averaged. The upper limit of L5/L15 is not particularly limited. Generally, it is difficult to obtain a value of L5/L15 which is equal to or more than about 5.0. Thus, 5.0 is the substantially upper limit of L5/L15.

The nickel layer of the steel foil according to the embodiment may be a nickel layer of which Fe is solid-soluted at a portion as long as the Ni layer has an fcc structure. Even when Fe is solid solution in Ni layer, polar density, a boundary, and a sub-boundary of the Ni layer may be specified using the above-described methods and the above-described definitions.

The nickel layer of the steel foil according to the embodiment is further required to include an upper layer portion and a lower layer portion, in a state of including the above-described texture and sub-boundaries of which a ratio is equal to or more than a predetermined value. The upper layer portion contains Ni of 90 mass % or more among metal elements. The lower layer portion contains Ni of less than 90 mass %, and Fe. A front surface of the upper layer portion is in contact with the chromium-based surface treatment layer and a back surface of the lower layer portion is in contact with the rolled steel foil.

When the Ni content of the upper layer portion is equal to or more than 90 mass % among the metal elements, corrosion resistance is improved. It is considered that this is because corrosion of the nickel layer occurring by a corrosion-causing substance included in an organic electrolyte is suppressed. When the Ni content of the upper layer portion is less than 90%, the Fe content in the surface of the nickel layer is relatively increased. In this case, the corrosion resistance is degraded. As a result, it is considered that adhesion between the substrate and the resin layer is degraded. The Ni content of the upper layer portion is preferably equal to or more than 95 mass %, and is more preferably equal to or more than 98 mass %. The Ni content may be 100%.

The upper layer portion is formed by adjusting reduction when rolling is performed on the nickel-plated layer after recrystallization annealing. In a case where the reduction is not adjusted, Fe is diffused in the entirety of the nickel layer, and nickel concentration on the outermost surface of the nickel layer is less than 90% among the metal elements.

Figure 3A:
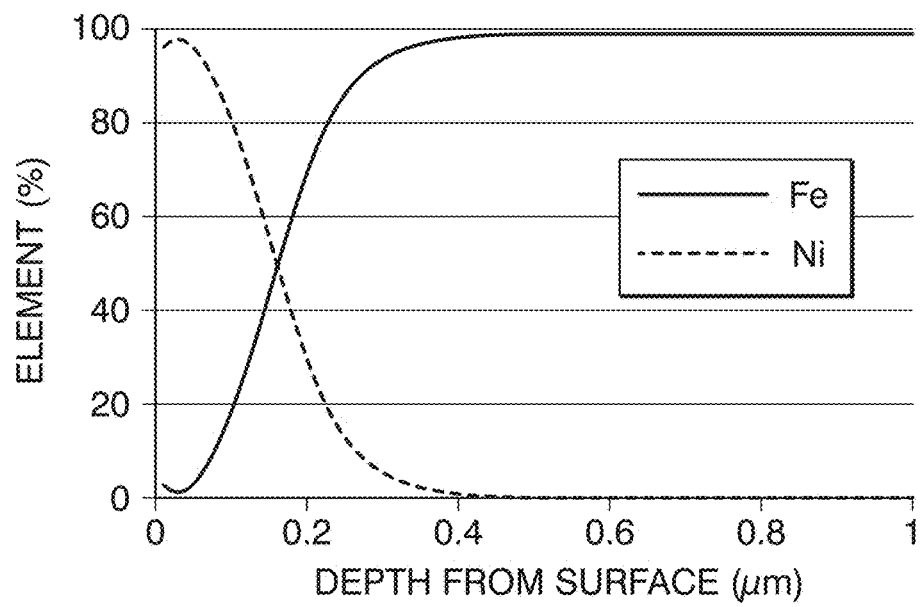
FIG. 3A is a graph showing a result obtained by analyzing a constituent metal element of a nickel layer along a depth direction.
Figure 3B:
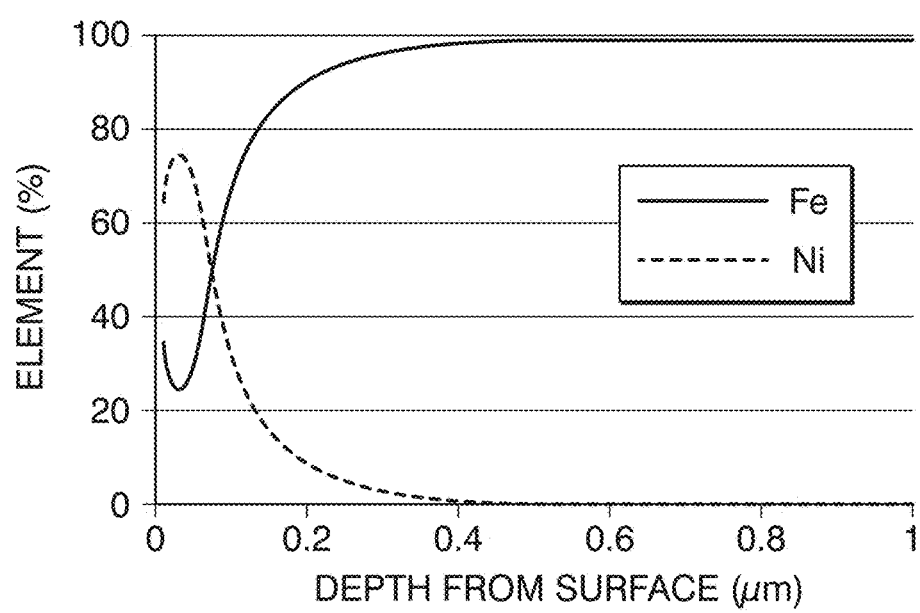
FIG. 3B is a graph showing a result obtained by analyzing the constituent metal element of the nickel layer in the depth direction.

FIG. 3A shows a metal element analysis result of the nickel layer including an upper layer portion in which Ni of 90 mass % or more among the metal elements in the depth direction is provided. FIG. 3B shows a metal element analysis result of the nickel layer which does not include an upper layer portion in which Ni of 90 mass % or more in the depth direction is provided. FIGS. 3A and 3B show results obtained by performing element analysis using glow discharge emission analysis while the nickel layer is etched to depth of 1 μm by argon plasma. Regarding a nickel layer shown in FIG. 3A, it is understood that the Ni content is more than 90 mass % among the metal element, and the Fe content is less than 10 mass % in a range from the surface to depth of 0.1 μm. Regarding a nickel layer shown in FIG. 3B, it is understood that the Ni content is less than 80 mass % which is the maximum. In FIGS. 3A and 3B, the Ni content is substantially 0% from when exceeding depth of 0.4 μm. This is because a portion deeper than 0.4 μm is the rolled steel sheet. Thus, in the nickel layer shown in FIG. 3A, a region in which the Ni content is equal to or more than 90%, until depth of 0.1 mm corresponds to the upper layer portion and a range in which the depth is 0.1 to 0.4 μm corresponds to the lower layer portion in which the Ni content is less than 90%. In the nickel layer shown in FIG. 3B, the maximum concentration of Ni is less than 80%, and thus, a region functioning as the upper layer portion is not provided.

In addition, the nickel layer is required to include a lower layer portion which contains Ni of less than 90 mass % among the metal elements, and Fe. Fe contained in the lower layer portion is mainly diffused from the rolled steel foil. When the lower layer portion is present, it is possible to improve adhesive strength between the nickel layer and the rolled steel foil, and to suppress exfoliation between the rolled steel foil and the nickel layer, due to a corrosion-causing substance included in an organic electrolyte.

The thickness of the upper layer portion is desirably equal to or more than 0.005 μm. When the thickness of the upper layer portion is less than 0.005 μm, sufficient corrosion resistance is not obtained. More desirably, the thickness of the upper layer portion is equal to or more than 0.02 μm. The upper limit of the thickness is not particularly limited from a viewpoint of electrolyte resistance. However, the Ni adhered amount by plating is required to be large or rolling having the significantly large number of passes is required, in order to become thick. Thus, the thickness is desirably equal to or less than 0.5 μm from an economical viewpoint.

The thickness of the lower layer portion is desirably equal to or more than 0.02 μm. Since the lower layer portion contributes to adhesion between the nickel layer and the rolled steel foil, when the lower layer portion is too thin, it is possible to ensure the adhesion. Desirably, the thickness of the lower layer portion is equal to or more than 0.1 μm. The upper limit is desirably equal to or less than 5 μm from an economical viewpoint, similarly to the upper layer portion.

In the nickel layer of the steel foil according to the embodiment, the adhered amount is desirably equal to or more than 0.3 $g/m^2$. When the adhered amount is set to be equal to or more than 0.3 $g/m^2$, it is possible to improve corrosion resistance against a corrosion-causing substance included in an organic electrolyte. If the adhered amount is less than 0.3 $g/m^2$, corrosion resistance against a corrosion-causing substance included in an organic electrolyte is not sufficiently obtained. In addition, it becomes difficult to specify texture by the EBSD method. Here, the adhered amount of the nickel layer in the embodiment is a value measured by a fluorescent X-ray test method which is defined based on JIS H8501. More detailed, the adhered amount of the nickel layer is a value obtained by measuring Kα fluorescent X-ray intensity of Ni from the surface of the nickel layer by the fluorescent X-ray test method and by converting the measurement into the adhered amount of the nickel layer.

As a calibration curve for converting the fluorescent X-ray intensity into the adhered amount, a calibration curve created as follows is used. A steel sheet having the same type as the substrate in which a Ni layer is not formed is set as a standard test material in which the Ni adhered amount is 0 and creates the calibration curve by measuring a Ni-plated steel sheet in which pure Ni having a predetermined amount is adhered to the same steel. Strictly, when the Ni adhered amount of a material which contains alloyed with Fe of base iron is measured using the calibration curve obtained using the standard test material to which pure Ni is adhered, the measured Ni adhered amount is lower than the actual Ni adhered amount. However, in the steel foil according to the embodiment, Ni is only distributed in the surface layer which is thinner than general plating of steel by foil rolling, and thus an influence of alloying is slight. In order to obtain desired corrosion resistance, the adhered amount which is equal to or more than the predetermined amount is desirable, and it is desirable that Ni concentration on the outermost surface is high. Thus, the adhered amount of the nickel layer is defined based on the Ni adhered amount which is measured in this manner, and thus it is possible to more reliably ensure corrosion resistance. Accordingly, in the embodiment, the adhered amount is defined as described above.

The upper limit of the adhered amount of the nickel layer is not particularly limited. However, in terms of cost, the upper limit of the adhered amount of Ni is preferably equal to or less than 5 $g/m^2$. A significant effect is obtained even though a nickel layer has the adhered amount which is such a small amount.

In a case of applying a nickel-plated layer in which texture is not controlled in the related art, only if the adhered amount is set to be equal to or more than about 9 $g/m^2$, an effect of improving the corrosion resistance against the corrosion-causing substance included in the organic electrolyte is not expected. Furthermore, the improvement effect in the related art is smaller than the improvement effect in this application invention. In the related art, only a slight improvement effect is obtained with an increase of the adhered amount of the nickel layer, and even in a case where the adhered amount is increased up to about 90 $g/m^2$, the significant improvement effect which is equivalent to that in the steel foil according to the embodiment is not obtained. In the embodiment, the nickel layer has a specific texture, and a portion, in which nickel of 90 mass % or more among the metal elements is contained, is present in the surface layer of the nickel layer. Thus, corrosion resistance against a nonaqueous electrolyte is largely improved, and the electrolyte resistance is improved.

<Chromium-Based Surface Treatment Layer>

The steel foil for a power storage device container according to the embodiment includes a chromium-based surface treatment layer on the surface of the nickel layer. The thickness of the chromium-based surface treatment layer is preferably set to be 2 nm to 200 nm, is more preferably set to be 5 nm to 60 nm, and is still preferably set to be 8 nm to 40 nm. The chromium-based surface treatment layer may be formed on at least a single surface, but may be formed on both surfaces.

In a case where the thickness of the chromium-based surface treatment layer is uniformly less than 2 nm or is ununiformly partially less than 2 nm, or has a pin hole, when a polyolefin-based resin layer is formed on the surface of the chromium-based surface treatment layer in the steel foil according to the embodiment, in order to use the steel foil as a material of the power storage device container, an adhesion force between the polyolefin-based resin layer and the substrate in the nonaqueous electrolyte may be insufficient, and thus exfoliation may be caused. If the thickness of the chromium-based surface treatment layer is thicker than 200 nm, cracks may occur in the chromium-based surface treatment layer when the steel foil for a power storage device container is processed. In this case, an adhesion force between the polyolefin-based resin layer and the substrate in the nonaqueous electrolyte may be insufficient, and thus exfoliation may be caused. If the chromium-based surface treatment layer is thicker than necessary, there is a disadvantage in that a used amount of chromate or a chromium-based compound which has a large environmental load.

The thickness of the chromium-based surface treatment layer is measured in a manner as follows. While Ar ions and the like are applied from the surface layer of the chromium-based surface treatment layer so as to perform sputtering, a present state of an element is examined by XPS analysis (X-ray photoelectron spectroscopic analysis) for each constant period. Specifically, as a result of the XPS analysis, sputtering depth from the surface layer until a Ni element is detected is set to be the thickness of the chromium-based surface treatment layer. As the sputtering depth, depth obtained by performing conversion at a sputtering rate of silica is used. In a case where the polyolefin-based resin layer is present on the surface, the surface is diagonally cut off by sharp-edged tool, and the obtained cross section is subjected to the XPS analysis.

<Polyolefin-Based Resin Layer>

The steel foil according to the embodiment may further include a polyolefin-based resin layer on the surface of the chromium-based surface treatment layer.

Specific examples of the polyolefin-based resin layer may include low density polyethylene, medium density polyethylene, high density polyethylene, linear low-density polyethylene, cross-linked polyethylene, polypropylene, or a mixture of two or more types of these substances.

The polyolefin-based resin layer may be a single layer or a multi-layer. A resin such as polyolefin, polyester, polyamide, and polyimide may be coated on the polyolefin-based resin layer so as to form multiple layers.

The range of the thickness of the polyolefin-based resin layer is preferably 0.5 to 200 μm, and is more preferably 15 to 100 μm. Even in a case where layers of polyolefin, polyester, polyamide, and polyimide are stacked over the polyolefin-based resin layer, a range of the thickness of all of the stacked layers is preferably 0.5 to 200 μm, and more preferably 15 to 100 μm. When the thickness of all of the layers is less than 0.5 μm, an effect of preventing permeation of the corrosion-causing substance included in the nonaqueous electrolyte may not be obtained. In addition when the thickness of all of the layers is thicker than 200 μm, for example, as in a case where workability becomes worse, the polyolefin-based resin layer is inappropriate as a member for a secondary battery container, and showing an economical advantage is difficult (the costs are increased).

The tensile strength of the steel foil according to the embodiment is desirably 600 to 1200 MPa. In a case where the tensile strength of the steel foil for a power storage device container is less than 600 MPa, enlargement and constriction of an active material with charging and discharging may cause the steel foil to be deformed in a case of being used as a power storage device container. If the tensile strength of the steel foil for a power storage device container is more than 1200 MPa, handling the steel foil is difficult.

Here, the tensile strength is measured by a method used in evaluating a thin plate material among tensile test methods of metal materials, which are defined in JIS Z2241 at a normal temperature. In a case of the steel foil, since roughness of an end surface has a significantly large influence, the roughness of surface finish on the end surface is required to be as small as possible when a test piece is manufactured. Thus, in a tensile test of a foil, a test piece based on JIS 13B is processed so as to cause roughness of an end surface to be set to be equal to or less than 0.2 μm in Ra. Then, the test piece is provided to the tensile test. A method of adjusting roughness is not limited. However, in the embodiment, a test piece is manufactured by a method in which a target steel foil is interposed and fixed on both sides, between thin steel sheets having a thickness of about 1 mm, and Fraise finishing is performed on an end surface.

The thickness of the substrate of the steel foil according to the embodiment is desirably equal to or less than 100 μm. This is because a thin container is desired with reducing the size and weight of a battery. The lower limit is not particularly limited. However, in terms of cost or uniformity of the thickness, the thickness of the steel foil is desirably set to be equal to or more than 5 μm.

Next, a power storage device container according to the embodiment will be described.

A power storage device container according to the embodiment includes a steel foil for a power storage device according to the embodiment and further includes the polyolefin-based resin layer on the surface of the chromium-based surface treatment layer. Specifically, the power storage device container is obtained in such a manner that the steel foil for a power storage device according to the embodiment, which includes the polyolefin-based resin layer is formed to have a shape as indicated by, for example, the reference symbol of 21 in FIG. 6 by using a well-known method. Since a chemical composition and a structure are not changed by formation, the chemical composition and the structure of the power storage device container according to the embodiment are equivalent to those of the steel foil for a power storage device according to the embodiment.

Next, a power storage device according to the embodiment will be described.

Figure 6:
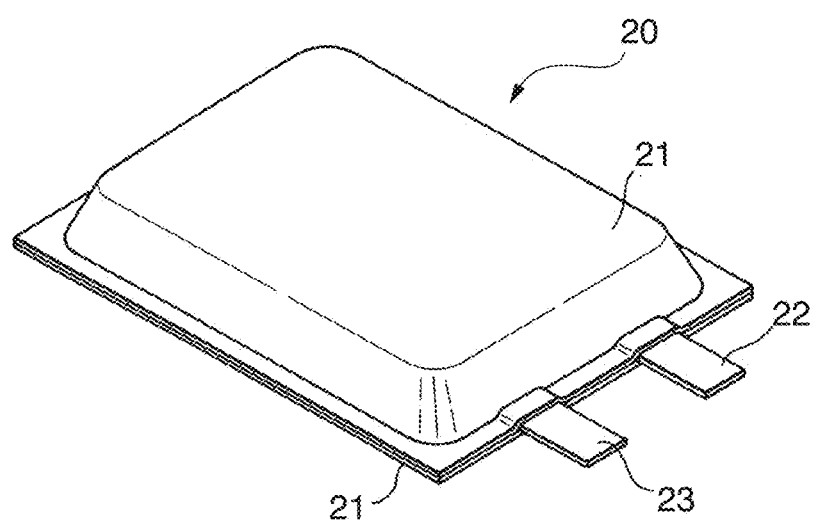
FIG. 6 shows an example of a power storage device including the power storage device container according to the embodiment.

A power storage device according to the embodiment includes a power storage device container. For example, as shown in FIG. 6, the power storage device according to the embodiment is obtained by storing at least a positive electrode and a negative electrode, which are dipped in an electrolyte, and a member constituting a battery in a power storage device container 21, and by providing positive lead 22 connected to the positive electrode, a negative lead 23 connected to the negative electrode, and the like.

Figure 4:
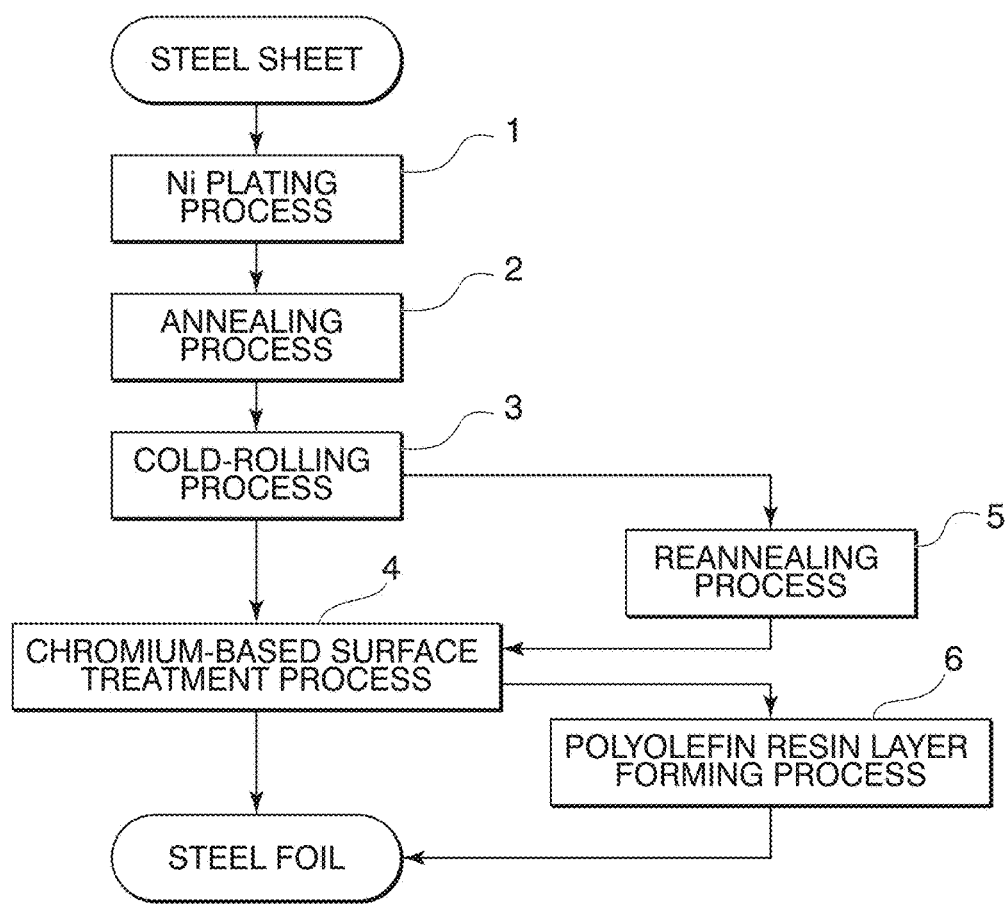
FIG. 4 is a flowchart showing a manufacturing method of the steel foil for a power storage device container according to the embodiment.

Next, a manufacturing method of a steel foil for a power storage device container, according to the embodiment will be described. As shown in FIG. 4, a manufacturing method of a steel foil for a power storage device container according to the embodiment includes a nickel-plating process of performing a nickel plating on a steel sheet, a recrystallization annealing process of performing an annealing on the steel sheet so that the nickel recrystallizes a nickel-plating process, a cold-rolling process of performing a cold rolling on the steel sheet so as to obtain a steel foil, and a chromium-based surface treatment process. By performing such processes, it is possible to manufacture a foil having a nickel layer which has specific texture, according to the embodiment. In addition, it is possible to adjust foil strength (tensile strength of steel foil) by performing the annealing again in the reannealing process after cold rolling process. In addition, a polyolefin resin layer forming process may be provided after the chromium-based surface treatment process.

Preferable conditions in each of the processes will be described.

(Nickel-Plating Process)

Firstly, a steel sheet obtained by a well-known method is subjected to nickel plating in order to obtain a steel foil including a nickel layer, according to the embodiment. The steel sheet at this time may be a cold-rolled steel sheet in a state of being cold-rolled, or may be a cold-rolled steel sheet after annealing. A forming method of nickel plating is not particularly limited. However, an electro-plating method is preferable from a point of cost. A molten bath used in electro-plating is not particularly limited. However, the Watt bath including nickel sulfate, nickel chloride, and boric acid is appropriate from a viewpoint of manufacturing cost or adhered-amount controllability. As the Watt bath, for example, a Watt bath which contains 200 to 400 g/l of nickel sulfate, 20 to 100 g/l of nickel chloride, and 5 to 50 g/l of boric acid may be used.

The adhered amount of a nickel-plated layer obtained by performing the nickel-plating process on a steel sheet is desirably equal to or more than 1 g/m$^2$. When the adhered amount is less than 1 g/m$^2$, a coverage ratio is decreased by the post cold rolling, and thus corrosion resistance against the corrosion-causing substance included in the organic electrolyte may be degraded. In addition, the post cold rolling may cause the adhered amount of the nickel layer in the steel foil to be less than 0.3 g/m$^2$. The upper limit is not required to be particularly limited. However, normally, the adhered amount is preferably equal to or less than 40 g/m$^2$, from a viewpoint of cost. The adhered amount of the nickel-plated layer before cold rolling is more preferably 10 to 30 g/m$^2$. However, even though the adhered amount of the nickel-plated layer before cold rolling is more than 40 g/m$^2$, a desired steel foil relating to a metallographic structure and metal characteristics may be obtained.

(Recrystallization Annealing Process)

Annealing is performed on the steel sheet (nickel-plated steel sheet) on which a nickel-plated layer is formed in the nickel-plating process, so as to cause recrystallization. Here, the recrystallization means (1) recrystallization of both of the steel sheet and the nickel-plated layer in a case where an original sheet before nickel plating is a plate which is not subjected to annealing yet, and means (2) recrystallization of the nickel-plated layer in a case where an original plate before nickel plating is an annealed plate. That is, annealing is performed so as to cause at least the nickel-plated layer to be recrystallization. When recrystallization temperatures of the nickel-plated layer and the steel sheet are compared to each other, normally, the recrystallization temperature of the nickel-plated layer is lower. This is because distortion applied to the nickel-plated layer in the nickel-plating process functions as a drive force of recrystallization.

It may be confirmed whether or not recrystallization is performed, by observing a structure or by measuring a hardness change. For example, the nickel-plated layer as being generated by electro-plating has Vickers hardness (HV) of about 250 to 300. However, if recrystallization occurs by annealing, the Vickers hardness (HV) is reduced to be equal to or less than 200. An appropriate annealing condition is determined by a product of the temperature and a time. That is, when temperature is high, annealing for a relatively short time is required, and when temperature is low, annealing for a relatively long time is required. Specific annealing methods include box annealing and continuous annealing.

Regarding the box annealing, treatment for a short time is not possible due to characteristics. Thus, in a case of box annealing, normally, treatment is performed for a long time of several hours to several days. The sheet temperature during box annealing is low, specifically, is set to be 500° C. to 700° C. in many cases. Regarding continuous annealing, treatment is preferably performed for a short time in order to improve productivity. Thus, in a case of continuous annealing, normally, treatment is performed for a short time of several seconds to several minutes in many cases. The sheet temperature during continuous annealing is high, specifically, is set to be 700° C. to 900° C. in many cases. In the recrystallization annealing process, any of box annealing and continuous annealing may be performed as long as temperature and time are controlled appropriately so as to cause recrystallization. In a case where recrystallization annealing is not performed under an appropriate condition, exfoliation of nickel plating easily occurs in the subsequent cold-rolling process. In addition, obtaining texture in which the <111> orientation is parallel to the rolling direction is not possible. In addition, the average value of L5/L15 may be less than 1.0.

(Cold-Rolling Process)

Cold rolling is performed on a nickel-plated steel sheet after the recrystallization annealing process, thereby manufacturing a steel foil. At this time, the thickness of the steel foil is preferably equal to or less than 100 μm, and more preferably equal to or less than 20 μm. In cold rolling after annealing, as will be described later, by controlling the rolling reduction on each pass, a rolled steel foil which includes an upper layer portion having nickel of 90% or more among the metal element, and a lower layer portion having Fe and nickel of less than 90%, and which has a nickel layer having a texture in which the <111> orientation is parallel to the rolling direction, and in which the average value of L5/L15 is equal to or more than 1.0, can be obtained.

Cumulative rolling reduction (total cumulative rolling reduction) until the final pass of cold rolling is equal to or more than 70%, and preferably equal to or more than 90%. Here, the cumulative rolling reduction is a percentage of cumulative reduction amount (difference between the thickness of the steel sheet at an inlet side before the first pass, and the thickness of the steel sheet at an outlet side after the current pass) until the current pass, to the thickness of the steel sheet at an inlet side on the first rolling pass. If the cumulative rolling reduction until the final pass is small, a desired Ni texture is not obtained. In addition, the foil strength may be less than 600 MPa. Furthermore, the average value of L5/L15 may be less than 1.0. The upper limit of the cumulative rolling reduction until the final pass is not particularly limited. However, approximately 98% is the limit from the view point of general rolling capability.

Cold rolling is performed on a number of passes. In order to form the upper layer portion and the lower layer portion in the nickel layer, reduction on each rolling pass is required to be controlled in addition to cumulative rolling reduction until the final pass. Specifically, the number of rolling passes is set to be equal to or more than seven passes, reduction on a first rolling pass is set to be equal to or less than 30%, cumulative rolling reduction until a fourth rolling pass (including the fourth rolling pass) is set to be equal to or less than 70%, and a difference between cumulative rolling reduction until a rolling pass before two passes from a final pass, and cumulative rolling reduction until the final pass is set to be equal to or less than 5%.

It is preferable to reduce the rolling reduction per one rolling pass by setting the number of rolling passes to be equal to or more than 7 passes. The rolling reduction on the first rolling pass is set to be equal to or less than 30%, and the cumulative rolling reduction on rolling passes until the fourth rolling pass is set to be equal to or less than 70%, so that the first half of the cumulative rolling reduction on the rolling passes is not excessively increased. Further, the difference between the cumulative rolling reduction until the rolling pass before two passes from the final pass, and the cumulative rolling reduction until the final pass is set to be equal to or less than 5%, and thus rolling is performed with suppressing the rolling reduction on the second half more than that on the first half. In this manner, by controlling the rolling reduction on each rolling pass, pure Ni can remain on the outermost surface of the nickel layer, and the upper layer portion and the lower layer portion can be formed in the nickel layer. If the above processes are performed out of the above conditions, the nickel layer is crushed at a once on the first half rolling pass, and thus forming the upper layer portion and the lower layer portion in the nickel layer is not possible.

The cold rolling in the manufacturing method according to the embodiment is based on an opposite view to a manufacturing method of a current collecting foil, in which the number of rolling passes is small to reduce manufacturing cost.

(Reannealing Process)

After the rolling, annealing may be performed again so as to adjust foil strength (reannealing process). When the annealing temperature in the reannealing process is too high, the texture of the nickel layer may be broken. Thus, even in a case where reannealing is performed, it is necessary that the annealing temperature is set to be equal to or lower than 600° C. In a case where reannealing is performed, the foil strength may be less than the above-described preferable range (600 to 1200 MPa). However, even in this case, the corrosion resistance against an electrolyte does not deteriorate.

(Chromium-Based Surface Treatment Process)

Chromium-based surface treatment is performed on a steel foil after cold rolling, so as to form a chromium-based surface treatment layer on the surface of the nickel layer. The chromium-based surface treatment includes a trivalent chromium treatment, a chromate treatment, and the like.

As a specific method of the chromium-based surface treatment, a method of performing coating with an aqueous solution in which chromium oxide is used as the main component, an aqueous solution in which chromium oxide and phosphoric acid is used as the main component, and the like, and a method of performing electrolytic chromate treatment is an exemplary example. In addition, as a well-known chromium-based surface treatment method in the related art, for example, a method in which coating with an aqueous solution in which chromium oxide and polyacrylic acid is used as the main component is performed, and heating and drying is performed is also an exemplary example. However, the method is not limited to the above-described methods.

(Polyolefin Resin Layer Forming Process)

A polyolefin resin layer may be formed on the steel foil after the chromium-based surface treatment process. The polyolefin resin layer may be stacked by a thermal laminate method.

A steel foil for a power storage device container manufactured in this manner is further subjected to press forming and the like, and is processed to be a power storage device container. Then, an electrode is inserted into the power storage device container, and a nonaqueous electrolyte such as an organic electrolyte in injected, thereby a power storage device is manufactured. For example, it is possible to manufacture a lithium-ion secondary battery by using a positive electrode and a negative electrode which can store and emit lithium ions as electrodes, and using an organic electrolyte including lithium salt as an electrolyte. It is possible to manufacture a capacitor by combination of an electrode formed of activated carbon, and an organic electrolyte.

EXAMPLES

Next, examples of the present invention will be described. However, conditions in the examples are just a condition example which is employed in order to confirm feasibility and effects of the present invention. The present invention is not limited to the condition example. The present invention may employ various conditions as long as the object of the present invention is achieved, without departing from the gist of the present invention.

Examples 1 to 24, 26, and 27 and Comparative Examples 3 and 6 to 10

A cold-rolled steel sheet (not-annealed material) having an element composition shown in Table 1 was subjected to degreasing and pickling, and then was subjected to nickel plating by an electro-plating method.

In nickel plating, nickel-plated layers having various adhered amounts were formed at a bath temperature of 65° C. and current density of 20 A/dm$^2$, by using a molten bath which contains 320 g/l of nickel sulfate, 70 g/l of nickel chloride, and 40 g/l of boric acid. Then, continuous annealing treatment was performed under an atmosphere of 5% H$_2$ (remainder N$_2$) at a predetermined temperature for a predetermined time. Then, cold rolling was performed at predetermined cumulative rolling reduction, thereby manufacturing a foil. Table 2 shows the thickness of an original sheet, the adhered amount of the nickel-plated layer (Ni-plated amount), which was measured by a fluorescent X-ray analysis device, an annealing condition, the total cumulative rolling reduction, and the thickness of the obtained foil.

Table 3 is a table which shows reduction patterns indicating the cumulative rolling reduction until each of the rolling passes in a case where the total cumulative rolling reduction (cumulative rolling reduction until the final pass) is respectively obtained. For example, Example 1 shows that, since the cumulative rolling reduction is 98%, and the reduction pattern is a reduction pattern A9, the total 17 passes were performed as shown at the reduction pattern A9 in Table 3.

TABLE 1

| Steel type | Steel element (mass %) remainder Fe and impurities | | | | | | | | |
|---|---|---|---|---|---|---|---|---|---|
| | C | Si | Mn | P | S | Al | N | Ti | Nb |
| Al-k | 0.01 | 0.007 | 0.11 | 0.012 | 0.009 | 0.09 | 0.002 | — | — |
| IF | 0.0019 | 0.009 | 0.09 | 0.012 | 0.0042 | 0.045 | 0.002 | 0.02 | 0.019 |

TABLE 2

| | | Steel type | Original sheet thickness (mm) | Adhered amount of nickel-plated layer g/m² | Annealing condition after plating Temperature (° C.) | Time (s) | Total cumulative rolling reduction % | Reduction pattern | Foil thickness μm |
|---|---|---|---|---|---|---|---|---|---|
| Examples | 1 | Al-k | 0.3 | 15 | 750 | 60 | 98 | A9 | 6 |
| | 2 | Al-k | 0.3 | 27 | 750 | 60 | 90 | A4 | 30 |
| | 3 | Al-k | 0.3 | 27 | 750 | 60 | 94 | A6 | 18 |
| | 4 | Al-k | 0.3 | 11 | 750 | 60 | 94 | A6 | 18 |
| | 5 | Al-k | 0.3 | 13 | 750 | 60 | 94 | A6 | 18 |
| | 6 | Al-k | 0.3 | 13 | 750 | 60 | 92 | A5 | 24 |
| | 7 | Al-k | 0.3 | 15 | 750 | 60 | 92 | A5 | 24 |
| | 8 | Al-k | 0.3 | 27 | 750 | 60 | 95 | A7 | 15 |
| | 9 | Al-k | 0.3 | 27 | 750 | 60 | 97 | A8 | 9 |
| | 10 | Al-k | 0.3 | 10 | 750 | 60 | 97 | A8 | 9 |
| | 11 | Al-k | 0.3 | 35 | 750 | 60 | 97 | A8 | 9 |
| | 12 | Al-k | 0.2 | 50 | 750 | 60 | 90 | A4 | 20 |
| | 13 | Al-k | 0.2 | 10 | 750 | 60 | 95 | A7 | 10 |
| | 14 | Al-k | 0.2 | 12 | 750 | 60 | 95 | A7 | 10 |
| | 15 | Al-k | 0.4 | 18 | 750 | 60 | 95 | A7 | 20 |
| | 16 | Al-k | 0.15 | 18 | 750 | 60 | 90 | A4 | 15 |
| | 17 | Al-k | 0.3 | 18 | 750 | 60 | 85 | A3 | 45 |
| | 18 | IF | 0.1 | 15 | 820 | 40 | 70 | A1 | 30 |
| | 19 | IF | 0.1 | 10 | 820 | 40 | 70 | A1 | 30 |
| | 20 | IF | 0.2 | 18 | 820 | 40 | 80 | A2 | 40 |
| | 21 | IF | 0.2 | 10 | 820 | 40 | 80 | A2 | 40 |
| | 22 | IF | 0.2 | 15 | 820 | 40 | 90 | A4 | 20 |
| | 23 | IF | 0.2 | 15 | 820 | 40 | 95 | A7 | 10 |
| | 24 | Al-k | 2.0 | 27 | 750 | 60 | 95 | A7 | 100 |
| | 25 | *1 Al-k | 0.2 | 16 | 600 | 60 | 90 | A4 | 20 |
| | 26 | Al-k | 0.3 | 7 | 750 | 60 | 97 | A8 | 9 |
| | 27 | IF | 0.2 | 4 | 820 | 40 | 95 | A7 | 10 |
| Comparative Examples | 1 | Al-k | 0.3 | 0 | 750 | 60 | 95 | B4 | 15 |
| | 2 | Al-k | 0.1 | 5 | 750 | 60 | 0 | — | 100 |
| | 3 | Al-k | 0.1 | 5 | 750 | 60 | 60 | B1 | 40 |
| | 4 | *1 Al-k | 0.2 | 9 | — | — | 90 | B3 | 20 |
| | 5 | Al-k | 0.02 | 9 | — | — | — | — | 20 |
| | 6 | Al-k | 0.3 | 1 | 750 | 60 | 95 | B4 | 15 |
| | 7 | Al-k | 0.3 | 10 | 750 | 60 | 97 | B5 | 9 |
| | 8 | Al-k | 0.15 | 10 | 750 | 60 | 60 | B2 | 60 |
| | 9 | Al-k | 0.15 | 10 | 750 | 60 | 60 | B6 | 60 |
| | 10 | Al-k | 0.3 | 10 | 750 | 60 | 90 | B7 | 30 |

*1 Annealing was performed after cold-rolling

TABLE 3

| Reduction pattern | Total cumulative rolling reduction | Number of rolling passes (%) | | | | | | | | | | | | | | | | |
|---|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 | 16 | 17 |
| A1 | 70 | 0 | 30 | 50 | 60 | 65 | 67 | 69 | 70 | | | | | | | | | | |
| A2 | 80 | 0 | 30 | 50 | 60 | 70 | 75 | 77 | 79 | 80 | | | | | | | | | |
| A3 | 85 | 0 | 30 | 50 | 60 | 70 | 75 | 80 | 83 | 84 | 85 | | | | | | | | |
| A4 | 90 | 0 | 30 | 50 | 60 | 70 | 75 | 80 | 83 | 86 | 89 | 90 | | | | | | | |
| A5 | 92 | 0 | 30 | 50 | 60 | 70 | 75 | 80 | 83 | 86 | 90 | 91 | 92 | | | | | | |
| A6 | 94 | 0 | 30 | 50 | 60 | 70 | 75 | 80 | 83 | 86 | 90 | 91 | 92 | 93 | 94 | | | | |
| A7 | 95 | 0 | 30 | 50 | 60 | 70 | 75 | 80 | 83 | 86 | 90 | 91 | 92 | 93 | 94 | 95 | | | |
| A8 | 97 | 0 | 30 | 50 | 60 | 70 | 75 | 80 | 83 | 86 | 90 | 91 | 92 | 93 | 94 | 95 | 96 | 97 | |
| A9 | 98 | 0 | 30 | 50 | 60 | 70 | 75 | 80 | 83 | 86 | 90 | 91 | 92 | 93 | 94 | 95 | 96 | 97 | 98 |
| B1 | 60 | 0 | 50 | 55 | 60 | | | | | | | | | | | | | | |

TABLE 3-continued

| Reduction pattern | Total cumulative rolling reduction | Number of rolling passes (%) | | | | | | | | | | | | | | | | |
|---|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 | 16 | 17 |
| B2 | 60 | 0 | 35 | 40 | 50 | 55 | 57 | 59 | 60 | | | | | | | | | | |
| B3 | 90 | 0 | 50 | 70 | 85 | 87 | 90 | | | | | | | | | | | | |
| B4 | 95 | 0 | 50 | 70 | 85 | 90 | 92 | 95 | | | | | | | | | | | |
| B5 | 97 | 0 | 50 | 70 | 85 | 90 | 92 | 95 | 97 | | | | | | | | | | |
| B6 | 60 | 0 | 20 | 30 | 40 | 50 | 60 | | | | | | | | | | | | |
| B7 | 90 | 0 | 30 | 55 | 65 | 75 | 80 | 85 | 88 | 90 | | | | | | | | | |

Example 25

Continuous annealing was performed on a cold-rolled steel sheet having an element composition Al-k shown in Table 1, at a holding temperature of 750° C. for a holding time of 60 seconds under an atmosphere of 5% $H_2$ (remainder $N_2$). Then, nickel plating, heat treatment, and cold rolling were performed, thereby manufacturing a steel foil. Conditions for nickel plating are the same as the plating conditions in Examples 1 to 24, 26, and 27. Heat treatment (annealing) after plating is performed at a holding temperature of 600° C. for a holding time of 60 seconds under an atmosphere of 5% $H_2$ (remainder $N_2$). Table 2 shows the thickness of an original sheet, the adhered amount of the nickel-plated layer, which was measured by a fluorescent X-ray analysis device, an annealing condition, the total cumulative rolling reduction, and the thickness of the obtained foil.

Comparative Example 1

Continuous annealing treatment was performed under an atmosphere of 5% $H_2$ (remainder $N_2$) at a predetermined temperature for a predetermined time, by using the cold-rolled steel sheet (not-annealed material) having an element composition Al-k shown in Table 1. Then, cold rolling was performed at predetermined cumulative rolling reduction, thereby manufacturing a foil. Nickel plating was not performed.

Comparative Example 2

Nickel plating was performed under the same condition as that in the previous example, by using a cold-rolled steel sheet (not-annealed material) having an element composition Al-k shown in Table 1. Then, continuous annealing treatment was not performed under an atmosphere of 5% $H_2$ (remainder $N_2$) at a predetermined temperature for a predetermined time. The cold rolling after annealing was not performed.

Comparative Example 4

Continuous annealing treatment was performed on a cold-rolled steel sheet having an element composition Al-k shown in Table 1, at a holding temperature of 750° C. for a holding time of 60 second under an atmosphere of 5% $H_2$ (remainder $N_2$). Then, nickel plating and cold rolling in which the cumulative rolling reduction is 60% was performed, thereby manufacturing a foil. As a molten bath, a bath obtained by adding 2 g/l of saccharin and 0.2 g/l of 2 butyne 1,4 diol as a luster additive to the bath having the previous condition was used. Other plating conditions are the same as the previous plating condition. In Comparative Example 4, a portion of Ni plating was exfoliated in the process of cold rolling. Thus, measuring Ni concentration or the Ni state of the nickel layer was not possible.

Comparative Example 5

Ni plating was performed on the foil by using the foil of 20 μm, which has an element composition Al-k shown in Table 1. That is, none of recrystallization annealing and cold rolling is performed in nickel plating in Comparative Example 5. Conditions for the nickel plating are the same as the previous plating condition.

Regarding the steel foils, the adhered amount of the nickel (Ni) layer, Ni concentration from the surface to predetermined depth, polar density of the <111> orientation in a RD direction, a ratio of the length L5 of a sub-boundary to the length L15 of a large angle boundary, and electrolyte resistance were evaluated. The evaluation methods are as follows.

(Evaluation Method)
Adhered Amount of Nickel Layer:

The adhered amount of the nickel layer was measured using a fluorescent X-ray analysis device, by a method similar to a method used for measuring the adhered amount of the Ni-plated layer in the steel sheet. Specifically, a square sample of which one side is 35 mm was cut out and Kα fluorescent X-ray intensity of Ni was measured from the surface of the nickel layer at a mask diameter of 30 mmφ, by using the fluorescent X-ray analysis device ZSX-100e (Rigaku Corporation). The adhered amount of Ni is obtained by converting the measured X-ray intensity into the adhered amount of Ni using the calibration curves which are created by measuring the same steel and a standard material obtained by adhering pure Ni plating to the steel.

Ni Concentration:

The nickel layer was etched to depth of 1 μm by argon plasma and Ni concentration was analyzed by glow discharge emission analysis. In a range measured in the depth direction, a region in which the Ni concentration was equal to or more than 90% on the surface side of the nickel layer was defined as an upper layer. A region of the nickel layer, which is on the steel foil side of the upper layer, and in which the Ni concentration was less than 90% was defined as a lower layer. Table 4 shows results. In a case where the Ni concentration was less than 90% on the surface side of the nickel layer, "being less than 90" was described in a field of the upper layer. This case means that the upper layer portion of the nickel layer in the present invention is not provided.

Polar Density and Ratio of Sub-Boundary:

The polar density and the ratio of the sub-boundary were measured by the EBSD method. Specifically, pretreatment (acetone ultrasonic degreasing) was performed on a sample, and then was set on a SEM/EBSD sample stand. Orientations were measured at an interval of 0.2 μm in an area of 120 μm in the RD direction and 100 μm in a TD direction. FE-SEM (SU-70 manufactured by Hitachi Ltd.) in which a Schottky type thermoelectron gun was mounted was used for the measuring, and an acceleration voltage was set to 25 kV. OIM system v5.31 manufactured by TSL solutions was used as software for performing analysis with the EBSD method.

Polar density of the <111> orientation was obtained from the reverse pole figure in RD, on the assumption that polar density in a random state is set to 1. The polar density of the <111> orientation here is the maximum value of polar density in a range within 5° of <111>.

With a method similar to the above descriptions, the length (sub-boundary length (L5)) of a sub-boundary which was a boundary between two crystals between which the angle difference (relative orientation difference) was 2° to 5°, and the length (boundary length (L15)) of a large angle boundary which is a boundary between two crystals between which the angle difference is equal to or more than 15° were measured, and a ratio L5/L15 was obtained.

Electrolyte Resistance:

A chromium-based surface treatment layer was formed on the steel foils in Examples 1 to 27 and Comparative Examples 1 to 7. Regarding the chromium-based surface treatment, phosphoric acid, hydrochloric acid, ammonium fluoride, and the like were appropriately added to a normal-temperature bath which contained 25 g/L of chromic anhydride, 3 g/L of sulfuric acid, and 4 g/L of nitric acid. An electrolytic chromate treatment layer was formed at a cathode current density of 25 A/dm$^2$, by using the bath obtained by the addition. The thickness of the chromate treatment layer was set to 10 nm by adjusting a treatment time. The film thickness is not proportional to the treatment time, and controlling the film thickness by using the conducted amount, the estimated reacting amount, and the like is not possible. Thus, the thickness of the chromate treatment layer was directly measured by XPS analysis (Quantum2000 type manufacture by PHI Corporation, X-ray source is AlKα (1486.7 eV) monochrome, output of X-ray is 15 kV and 1.6 mA), and was controlled. In the examples and the comparative examples, a chromate treatment was performed only on a single surface.

Then, a polypropylene film having a thickness of 30 μm was laminated on the chromate treatment layer.

10 sample pieces were manufactured in each of the examples by cutting the steel foil which has a polypropylene film laminated thereon so as to be 5 mm×40 mm. The five sample pieces which were the half were completely immersed in an electrolyte in a polypropylene bottle which can be enclosed by using a lid. Then, the sample pieces were maintained at 80° C. for 7 days. A 180° peel test based on JIS K 6854-2 was performed on all of the five sample pieces which had not been immersed in the electrolyte and on the five sample pieces which had been immersed in the electrolyte and the adhesive strength of the polypropylene film was measured. A percentage was obtained by dividing an average of adhesive strength of the immersed sample pieces by an average of adhesive strength of the sample pieces which had not been immersed. The obtained percentage was set as a decrease ratio, and was used as an index of the electrolyte resistance. It is shown that the electrolyte resistance is increased as the decrease ratio becomes lower.

In this test, the decrease ratio in Comparative Example 2 (nickel plating itself) is about 50%. In this example, based on Comparative Example 2, a case where the decrease ratio is smaller than 30% was determined to be much better than that in Comparative Example 2, and was evaluated as Superior (S). A case of being equal to or more than 30% and less than 45% was determined to be better than that in Comparative Example 2, and was evaluated as Excellent (Ex). A case of being equal to or more than 45% and less than 50% was determined to be better than that in Comparative Example 2 but be worse that "Ex", and was evaluated as GOOD (G). A case of being equal to or more than 50% and less than 60% was determined to be equal to that in Comparative Example 2 and was evaluated as POOR (P). A case of being equal to or more than 60% was determined to be worse than that in Comparative Example 2 and was evaluated as BAD (B). As an electrolyte, a liquid obtained by diluting hexafluorophosphate (LiPF$_6$) with a solvent so as to have concentration of 1 mol/L is used. The solvent is a mixture obtained by mixing ethylene carbonate and diethyl carbonate at 1:1. Table 4 shows results.

TABLE 4

|  |  | Ni concentration (%) | | Ni state (EBSD) | | Adhered amount of nickel layer g/m$^2$ | Electrolyte resistance |
|---|---|---|---|---|---|---|---|
|  |  | Upper layer | Lower layer | <111> polar density | L5/L15 | | |
| Examples | 1 | >90 | less than 90 | 4.4 | 2.6 | 0.3 | Ex |
|  | 2 | >90 | less than 90 | 3.9 | 1.6 | 2.7 | S |
|  | 3 | >90 | less than 90 | 4.0 | 2.0 | 1.62 | S |
|  | 4 | >90 | less than 90 | 4.0 | 2.0 | 0.66 | S |
|  | 5 | >90 | less than 90 | 4.1 | 2.0 | 0.78 | S |
|  | 6 | >90 | less than 90 | 4.0 | 2.0 | 1.04 | S |
|  | 7 | >90 | less than 90 | 3.9 | 1.9 | 1.2 | S |
|  | 8 | >90 | less than 90 | 4.1 | 2.0 | 1.35 | S |
|  | 9 | >90 | less than 90 | 4.3 | 2.2 | 0.81 | S |
|  | 10 | >90 | less than 90 | 4.3 | 2.2 | 0.3 | Ex |
|  | 11 | >90 | less than 90 | 4.3 | 2.3 | 1.05 | S |
|  | 12 | >90 | less than 90 | 3.8 | 1.7 | 5.0 | S |
|  | 13 | >90 | less than 90 | 4.0 | 1.8 | 0.5 | S |
|  | 14 | >90 | less than 90 | 4.1 | 1.9 | 0.6 | S |
|  | 15 | >90 | less than 90 | 4.1 | 2.1 | 0.9 | S |
|  | 16 | >90 | less than 90 | 3.9 | 1.6 | 1.8 | S |
|  | 17 | >90 | less than 90 | 3.7 | 1.4 | 2.7 | S |

TABLE 4-continued

|  |  | Ni concentration (%) | | Ni state (EBSD) | | Adhered amount of nickel layer | Electrolyte |
|---|---|---|---|---|---|---|---|
|  |  | Upper layer | Lower layer | <111> polar density | L5/L15 | g/m² | resistance |
|  | 18 | >90 | less than 90 | 3.0 | 1.0 | 4.5 | Ex |
|  | 19 | >90 | less than 90 | 3.0 | 1.0 | 3.0 | Ex |
|  | 20 | >90 | less than 90 | 3.5 | 1.2 | 3.6 | S |
|  | 21 | >90 | less than 90 | 3.4 | 1.3 | 2.0 | S |
|  | 22 | >90 | less than 90 | 4.0 | 2.0 | 1.5 | S |
|  | 23 | >90 | less than 90 | 4.2 | 2.2 | 0.75 | S |
|  | 24 | >90 | less than 90 | 4.1 | 2.0 | 1.35 | S |
|  | 25 | >90 | less than 90 | 3.9 | 1.6 | 1.6 | S |
|  | 26 | >90 | less than 90 | 4.4 | 2.2 | 0.2 | G |
|  | 27 | >90 | less than 90 | 3.4 | 1.3 | 0.2 | G |
| Comparative Examples | 1 | — | — | — | — | 0 | B |
|  | 2 | >90 | less than 90 | 0.7 | 0.04 | 5.0 | P |
|  | 3 | >90 | less than 90 | 2.0 | 0.4 | 2.0 | P |
|  | 4 | — | — | — | — | 0.5 *2 | B |
|  | 5 | >90 | less than 90 | 0.7 | 0.9 | 9.0 | P |
|  | 6 | less than 90 | less than 90 | 4.1 | 2.1 | 0.05 | P |
|  | 7 | less than 90 | less than 90 | 4.3 | 2.2 | 0.3 | P |
|  | 8 | >90 | less than 90 | 3.1 | 0.8 | 4.0 | P |
|  | 9 | >90 | less than 90 | 2.8 | 1.0 | 4.0 | P |
|  | 10 | less than 90 | less than 90 | 3.5 | 1.5 | 1.0 | P |

*2 A portion of plating was exfoliated during cold-rolling

As shown in Table 4, the examples in the present invention show good electrolyte resistance. The comparative examples have results in which the electrolyte resistance is bad.

Regarding texture of the nickel layers in Examples 1 to 27 and Comparative Examples 6 and 7 shown in Table 4, the integration degree of the <111> and <001> orientations in RD is high, and polar density of the <111> orientation in RD is equal to or more than 3.0. Regarding ND, integration is viewed from <101> over <112>. Regarding TD, integration of the <101> orientation is viewed. However, polar density in ND and TD is lower than 2. Thus, in the examples and comparative examples, the nickel layer including texture in which the <111> orientation is parallel to the rolling direction is provided. Further, in Examples 1 to 27, an upper layer in which the Ni concentration is equal to or more than 90%, and a lower layer in which the Ni concentration is less than 90% were included in the nickel layer. Thus, it is considered that Examples 1 to 27 show good electrolyte resistance. In Comparative Examples 6 and 7, a region in which the Ni concentration is less than 90% and a region in which Ni concentration is equal to or more than 90% were not included in the surface of the nickel layer. Thus, it is considered that Comparative Examples 6 and 7 have low electrolyte resistance.

In Comparative Examples 2 to 5, the integration degree of the <111> and <001> orientations in RD is low, the polar density of the <111> orientation in RD is less than 3.0, and the <111> orientation is not parallel to the rolling direction. Thus, it is considered that electrolyte resistance is low.

INDUSTRIAL APPLICABILITY

According to the present invention, it is possible to provide a steel foil for a power storage device container, which maintains adhesion force between a substrate and a resin layer even in an electrolyte and has good corrosion resistance in a case of being used in a power storage device container of which a polyolefin resin layer is formed on a surface, in the rolled steel foil having high strength, at a low price. It is possible to provide a power storage device container including the steel foil for a power storage device container, and a power storage device including the power storage device container. Thus, industrial usability is high.

BRIEF DESCRIPTION OF THE REFERENCE SYMBOLS

1 NICKEL-PLATING PROCESS
2 RECRYSTALLIZATION ANNEALING PROCESS
3 COLD-ROLLING PROCESS
4 CHROMIUM-BASED SURFACE TREATMENT PROCESS
5 REANNEALING PROCESS
6 POLYOLEFIN-BASED RESIN LAYER FORMING PROCESS
11 SUBSTRATE
12 ROLLED STEEL FOIL
13 NICKEL-PLATED LAYER
14 CHROMIUM-BASED SURFACE TREATMENT LAYER
15 POLYOLEFIN-BASED RESIN LAYER
20 POWER STORAGE DEVICE
21 POWER STORAGE DEVICE CONTAINER
22 POSITIVE LEAD
23 NEGATIVE LEAD

What is claimed is:

1. A steel foil for a power storage device container comprising:
   a rolled steel foil;
   a nickel layer which is formed on a surface of the rolled steel foil; and
   a chromium-based surface treatment layer which is formed on a surface of the nickel layer,
   wherein the nickel layer includes an upper layer portion which is in contact with the chromium-based surface treatment layer and contains Ni of 90 mass % or more among metal elements, and a lower layer portion which is in contact with the rolled steel foil and contains Ni of less than 90 mass % among the metal elements and Fe, a <111> polar density in a reverse pole figure of the nickel layer in a rolling direction is 3.0 to 6.0, the nickel layer has a sub-boundary which is a grain boundary between two crystals having a relative orientation difference of 2° to 5°, and a large angle boundary which is a grain boundary between two crystals having the relative orientation difference of equal to or more than 15°, and an average value of a ratio L5/L15 between a boundary length L5 which is a length of the sub-boundary, and a boundary length L15 which is a length of the large angle boundary, is equal to or more than 1.0.

2. The steel foil for a power storage device container according to claim 1, wherein an adhered amount of the nickel layer is equal to or more than 0.3 g/m$^2$.

3. The steel foil for a power storage device container according to claim 2, further comprising:

a polyolefin-based resin layer which is formed on a surface of the chromium-based surface treatment layer.

4. The steel foil for a power storage device container according to claim 1, further comprising:

a polyolefin-based resin layer which is formed on a surface of the chromium-based surface treatment layer.

5. A power storage device container which includes the steel foil for a power storage device container according to claim 4.

6. A power storage device comprising:

the power storage device container according to claim 5.

7. A manufacturing method of a steel foil for a power storage device container, the method comprising:

a nickel-plating process of performing a nickel plating on a steel sheet so as to form a nickel-plated layer on the steel sheet, and obtaining a nickel-plated steel sheet;

a recrystallization annealing process of performing an annealing on the nickel-plated steel sheet so that the nickel-plated layer recrystallizes;

a cold-rolling process of performing a cold rolling on the nickel-plated steel sheet so as to obtain a steel foil; and a chromium-based surface treatment process of performing a chromium-based surface treatment on the steel foil, wherein in the cold-rolling process, the number of rolling passes is set to be equal to or more than seven passes, a reduction on a first rolling pass is set to be equal to or less than 30%, a cumulative rolling reduction until a fourth rolling pass is set to be equal to or less than 70%, a difference between a cumulative rolling reduction until a rolling pass before two passes from a final pass, and a cumulative rolling reduction until the final pass is set to be equal to or less than 5%, and the cumulative rolling reduction until the final pass is set to be equal to or more than 70%.

8. The manufacturing method of a steel foil for a power storage device container, according to claim 7, wherein in the nickel-plating process, an adhered amount of the nickel-plated layer is set to be equal to or more than 1 g/m$^2$.

9. The manufacturing method of a steel foil for a power storage device container, according to claim 8, further comprising:

a polyolefin resin layer forming process of forming a polyolefin resin layer on the surface of the steel foil after the chromium-based surface treatment process.

10. The manufacturing method of a steel foil for a power storage device container, according to claim 7, further comprising:

a polyolefin resin layer forming process of forming a polyolefin resin layer on the surface of the steel foil after the chromium-based surface treatment process.

* * * * *